(12) United States Patent
Larkin et al.

(10) Patent No.: US 8,622,090 B2
(45) Date of Patent: Jan. 7, 2014

(54) PLUMBING FITTING

(75) Inventors: Anthony William Larkin, Bankstown (AU); Ronnie Shoushani, Bankstown (AU)

(73) Assignee: Larkin & Shoshani Solutions Pty Ltd., Bankstown (AU)

( * ) Notice: Subject to any disclaimer, the term of this patent is extended or adjusted under 35 U.S.C. 154(b) by 0 days.

(21) Appl. No.: 13/129,580

(22) PCT Filed: Nov. 18, 2009

(86) PCT No.: PCT/AU2009/001497
§ 371 (c)(1),
(2), (4) Date: May 17, 2011

(87) PCT Pub. No.: WO2010/057248
PCT Pub. Date: May 27, 2010

(65) Prior Publication Data
US 2011/0220211 A1  Sep. 15, 2011

(30) Foreign Application Priority Data
Nov. 18, 2008 (AU) ................................ 2008243269

(51) Int. Cl.
*F16K 15/14* (2006.01)
(52) U.S. Cl.
USPC ................ 137/844; 137/846; 137/362; 4/287
(58) Field of Classification Search
USPC ................. 137/844, 846, 15.18, 15.19; 4/287
See application file for complete search history.

(56) References Cited

U.S. PATENT DOCUMENTS

| 4,098,287 | A | 7/1978 | Baumbach |
| 4,870,992 | A | 10/1989 | Irwin et al. |
| 6,795,987 | B2 * | 9/2004 | Cornwall ........................ 4/679 |
| 2004/0049846 | A1 | 3/2004 | Cornwall |
| 2005/0092372 | A1 * | 5/2005 | Wade ........................ 137/527.6 |

FOREIGN PATENT DOCUMENTS

| AU | 2005202307 | 12/2006 |
| CA | 2450304 | 12/2002 |
| CA | 2429950 | 3/2004 |
| EP | 1174549 | 1/2002 |
| EP | 1785077 | 5/2007 |
| FR | 2896292 | 7/2007 |
| GB | 2296309 | 6/1996 |
| GB | 2352497 | 1/2001 |
| JP | 11172736 | 6/1999 |
| JP | 2004124531 | 4/2004 |
| JP | 2004197452 | 7/2004 |
| JP | 2008013948 | 1/2008 |
| WO | WO2004059198 | 7/2004 |
| WO | WO2006000524 | 1/2006 |

* cited by examiner

Primary Examiner — Kevin Lee
Assistant Examiner — Macade Brown
(74) Attorney, Agent, or Firm — Mark M. Friedman

(57) ABSTRACT

A blocking plumbing fitting; said fitting comprising a flexible cup element adapted for insertion into a pipe element; said fitting further comprising a one way valve element depending from said flexible cup element, wherein said one way valve element permits liquid to pass through said pipe element; said one way valve element preventing passage of odors, soap-suds, vermin, noise and other undesirable elements issuing from said pipe element.

11 Claims, 8 Drawing Sheets

PLUMBING FITTING

CROSS REFERENCE TO RELATED APPLICATON

This application claims foreign from and the benefit of Australian Patent Application #2008243269 filed in the Australian Patent Office on Nov. 18, 2008.

The present invention relates to plumbing fittings and, more particularly, to fittings for the control of waste liquid, odour, foamy soap suds, vermin and noise reduction from waste liquid connections.

BACKGROUND

Floor wastes for the drainage of waste water from bathroom shower recesses for example, are typically connected to the sewerage system via goose neck or "S" bend trap fitting designed to maintain a volume of water as a barrier between the floor waste and the sewer and thereby prevent the emission of sewer odours into the bathroom.

Although usually effective in the blockage of odours, the volume of water may not always be maintained to a sufficient level to block all air (and therefore odour) passage through the "S" bend trap and hence up through the waste outlet. In some situations, negative pressure downstream of the trap, can partially suck the water from the trap and thus allow odour to pass back up through the waste outlet. This is not an uncommon problem in multi-story installations where volumes of waste water fall through the common plumbing line; the passage of the water causing the suction at S bends at lower levels.

Some waste installations may occur in which there is no water trap, or the water trap is at considerable remove from the waste outlet so that odours and other undesirable effects may issue into the building.

It is an object of the present invention to address or at least ameliorate some of the above disadvantages.

Notes
1. The term "comprising" (and grammatical variations thereof) is used in this specification in the inclusive sense of "having" or "including", and not in the exclusive sense of "consisting only of".
2. The above discussion of the prior art in the Background of the invention, is not an admission that any information discussed therein is citable prior art or part of the common general knowledge of persons skilled in the art in any country.

BRIEF DESCRIPTION OF INVENTION

Accordingly, in a first broad form of the invention, there is provided a blocking plumbing fitting; said fitting comprising a flexible cup element adapted for insertion into a pipe element; said fitting further comprising a one way valve element depending from said flexible cup element, wherein said one way valve element permits liquid to pass through said pipe element; said one way valve element preventing passage of odours, soapsuds, vermin, noise and other undesirable elements issuing from said pipe element.

Preferably, said fitting is located downstream of a waste outlet.

Preferably, said waste outlet includes, floor wastes of showers, laundry, plant room, commercial kitchens and other water receiving bodies.

Preferably, said flexible cup element comprises a number of tiers; said tiers having outer diameters conforming to inner diameters of a range of standard pipe sizes.

Preferably, one or more tiers may be removed from said cup element so as to adapt said fitting to a desired standard pipe size.

Preferably, outer surfaces of said flexible cup element form an air tight seal with portions of inner surfaces of a said pipe element when said fitting is inserted into said pipe element.

Preferably, said one way valve comprises a flexible sheath formed of two opposing elongate flexible flaps joined at their respective side edges.

Preferably, inward facing surfaces of said two opposing elongate flexible flaps are in contact one to another when waste water is absent from said waste outlet; contact between said surfaces preventing odour, soapsuds, vermin, noise and other undesirable elements from issuing from said pipe element.

Preferably, flexibility of said elongate flexible flaps is such that said flaps are forced apart by water flowing into said cup element; said water passing between said flaps and issuing from a lower end of said one way valve.

Preferably, a lower end of said cup element is provided with an aperture; said aperture communicating with a funnel structure merging with upper portions of said opposing elongate flaps.

Preferably, said fitting is of unitary construction.

Preferably, said one way valve is releasably attached to said cup element.

Preferably, said flexible cup element is stepped down in diameter in stages from a first diameter at an upper rim of said cup element to a second diameter at said aperture.

Preferably, volume of said flexible cup element is arranged such that weight of water in said cup element is sufficient to force a passage for water between said opposing elongate flexible flaps.

In another broad form of the invention, there is provided a method of preventing odours, soapsuds, vermin, noise and other undesirable elements, from issuing from a waste outlet fitting for waste liquid; said method including the steps of:
 (a) removing a grating cover from said waste outlet fitting,
 (b) inserting into a waste pipe below said waste outlet fitting, an assembly of a waste water receiving cup element and a one way valve depending from said receiving cup element,
 (c) replacing said grating cover.

Preferably, said water receiving cup element forms an odour seal with internal surfaces of said waste pipe.

Preferably, said one way valve comprises opposing flaps of a flexible material; internal surfaces of said opposing flaps in contact one with another when said one way valve is an odour blocking position.

Preferably, volume and weight of water in said receiving cup element, and flexibility of said opposing flaps of flexible material is such that said flaps of flexible material are forced apart by said volume and weight of water to form a passage for discharge of said water from said fitting.

Accordingly in a further broad form of the invention there is provided a method of minimizing exit of waste liquid odour, foamy soap suds, vermin and noise from an entry to a pipe element; said method comprising resiliently sealing an internal portion of said pipe element near said entry whereby liquids passing into said entry can pass forwardly through said entry but said waste liquid, odour, foamy soap suds, vermin and noise is blocked from passing in the opposite direction.

Preferably said method further includes provision of a guide path from said entry to a region of constriction.

Preferably said region of constriction is inflected relative to direction of flow of said liquid.

Preferably said region of constriction includes opposed, flexible planar elements.

BRIEF DESCRIPTION OF DRAWINGS

Embodiments of the present invention will now be described with reference to the accompanying drawings wherein.

DETAILED DESCRIPTION OF PREFERRED EMBODIMENTS

Figure 1:
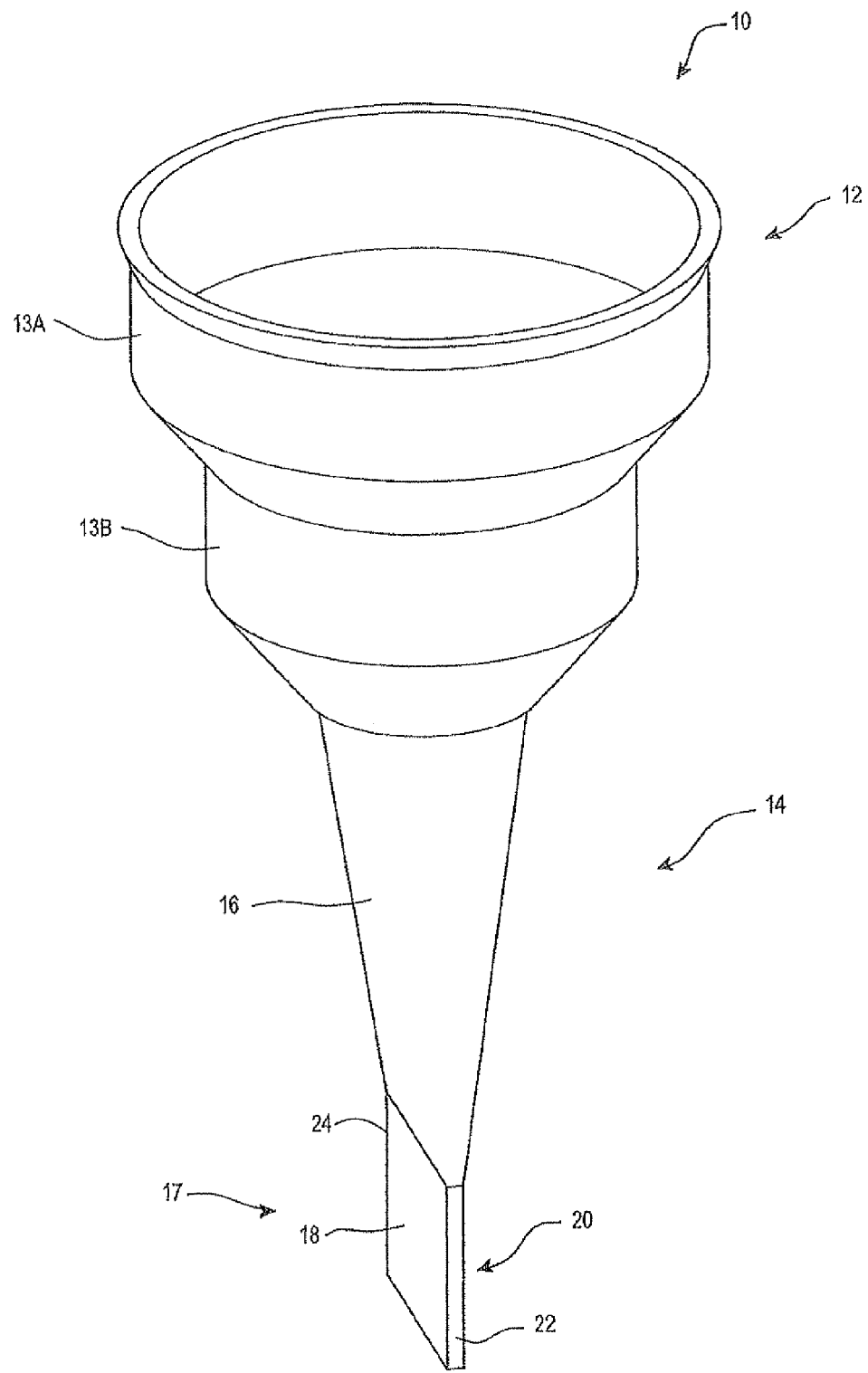
FIG. 1 is a perspective view of a plumbing fitting according to a preferred embodiment of the invention.
Figure 2:
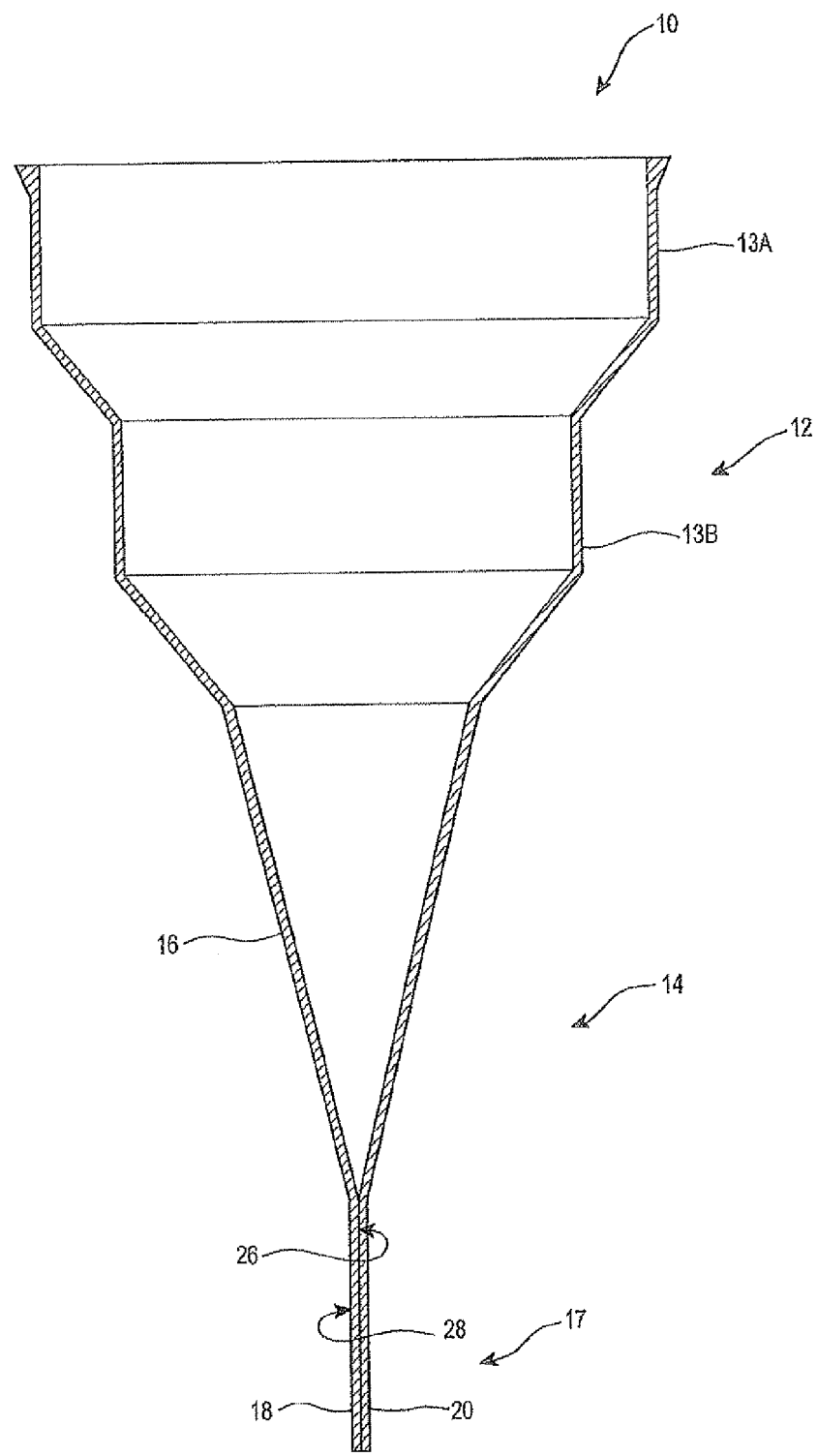
FIG. 2 is a sectioned side view of the embodiment of FIG. 1 when in an odour, soapsuds, vermin or noise blocking condition.

With reference to FIGS. 1 and 2, in a preferred embodiment of the invention, a plumbing fitting 10 is comprised of a flexible cup element 12 and, in this instance, a flexible one-way valve element 14 depending from the cup element 12. Both cup element 12 and valve element may be moulded or otherwise fabricated from a flexible elastomer as an integral unit, as shown in FIG. 2. Alternatively, one-way valve element 14 could form a separate element, releasably attached to a spigot extending from the lower end of the cup element 12.

One-way valve element 14 comprises a funnel-like structure 16 at its upper end, merging into a flexible sheath 17 formed of two opposing elongate flexible elastomer flaps 18 and 20 joined at their respective side edges 22 and 24. As manufactured and in the non-liquid passing state of the one-way valve 14 as shown in FIGS. 1 and 2, the inward facing surfaces 26 and 28 of the two opposing elongate flexible elastomer flaps 18 and 20, are in contact one to another.

Figure 3:
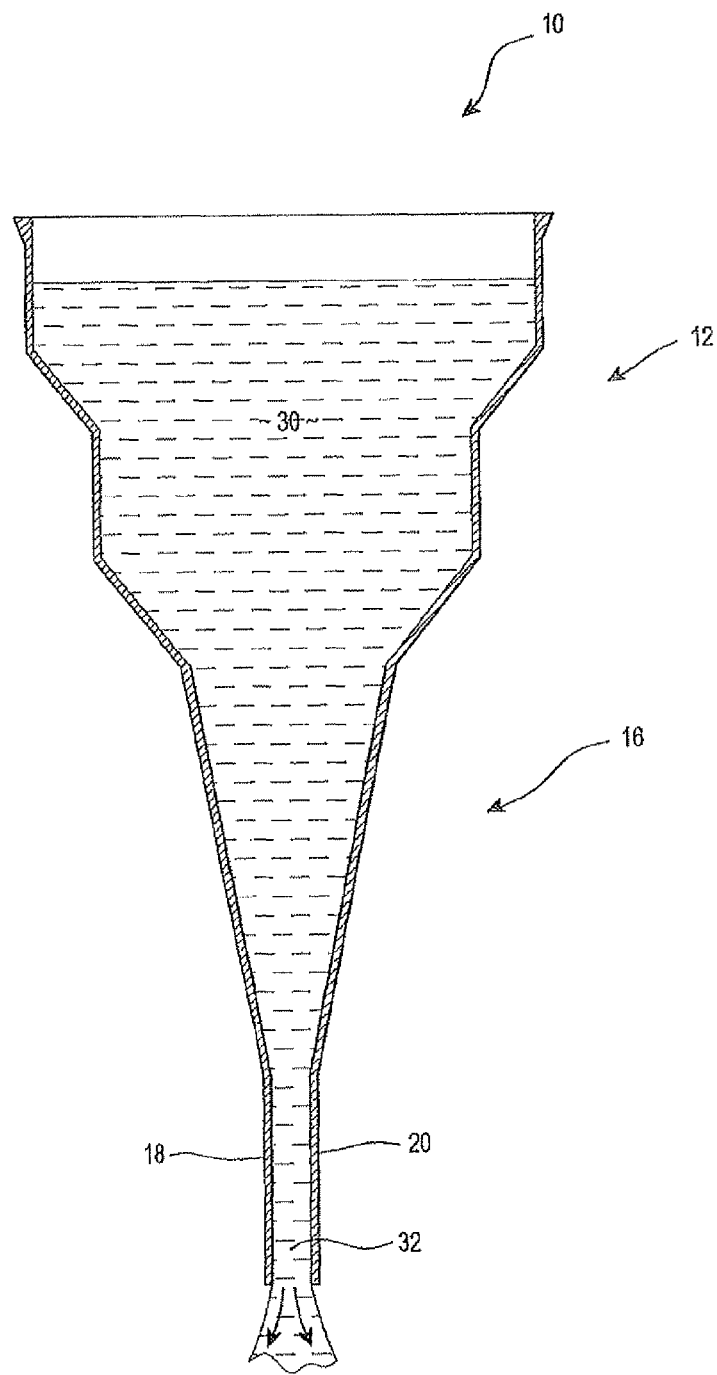
FIG. 3 is a sectioned side view of the embodiment of FIG. 1 when in a waste liquid passing condition.

FIG. 3 shows the plumbing fitting 10 when the cup element 12 and the funnel-like structure 16 fill with water 30. The volume and weight of water 30 is then such as to force apart the middle portions of the two opposing flaps 18 and 20, so that a passage 32 is formed between them allowing water to discharge freely from the fitting 10.

Figure 4:
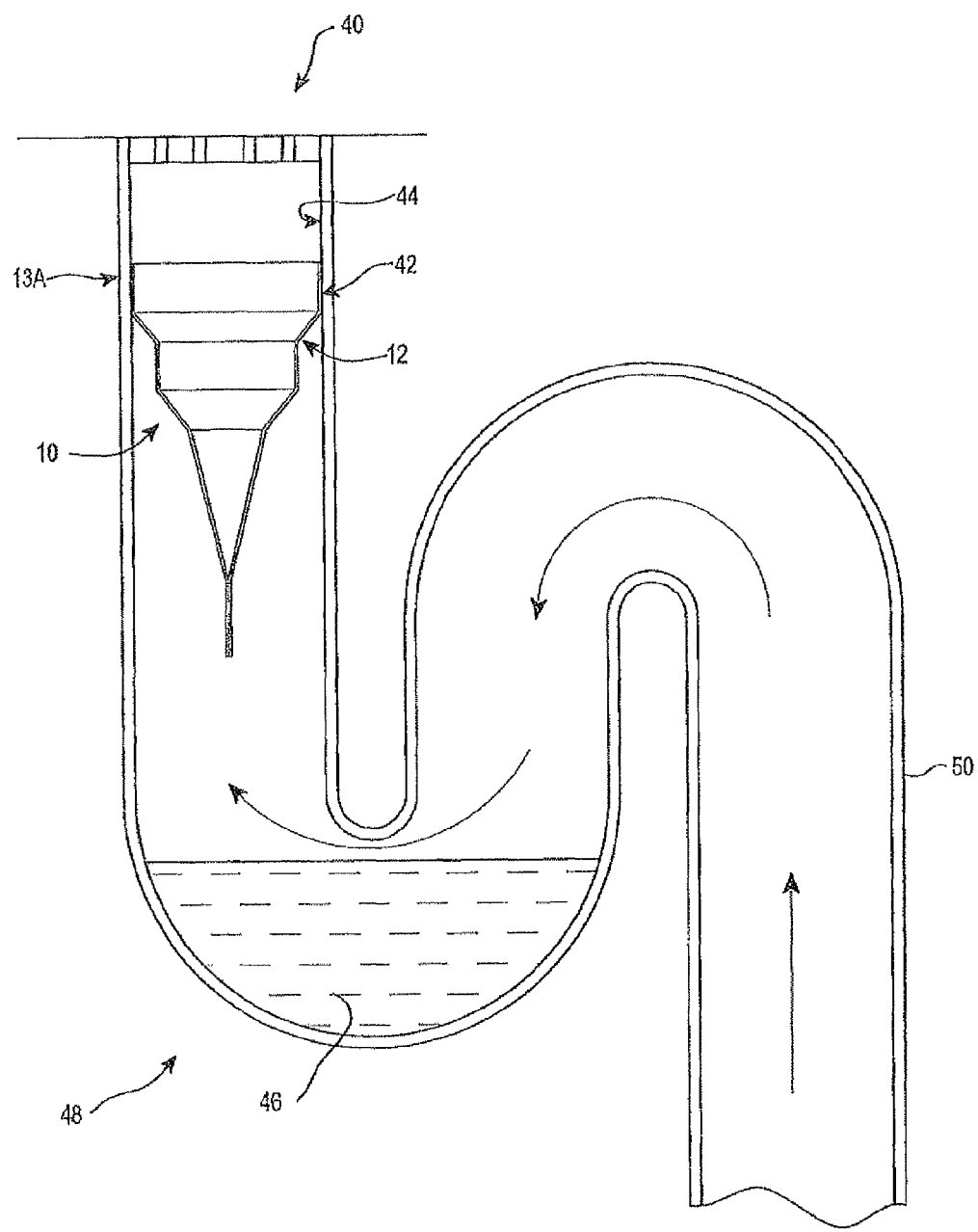
FIG. 4 is a side view of the plumbing fitting inserted in a waste pipe below a conventional waste outlet and "S" bend assembly in use.

Cup element 12 is shaped and dimensioned so as to be able to be inserted into a waste pipe below an outlet fitting 40 as shown in FIG. 4. The outer diameter of the upper section 42 of cup element 12 is such as to form an airtight and odour proof seal between the outer surfaces of the cup element and the internal surfaces 44 of the waste pipe. Thus it can be seen from FIG. 4 that even if water 46 is lost, or partially lost, from the water trap of "S" bend 48, so as to allow a passage for odour rising up waste pipe 50, no odour can pass by the plumbing fitting 10.

Figure 5:
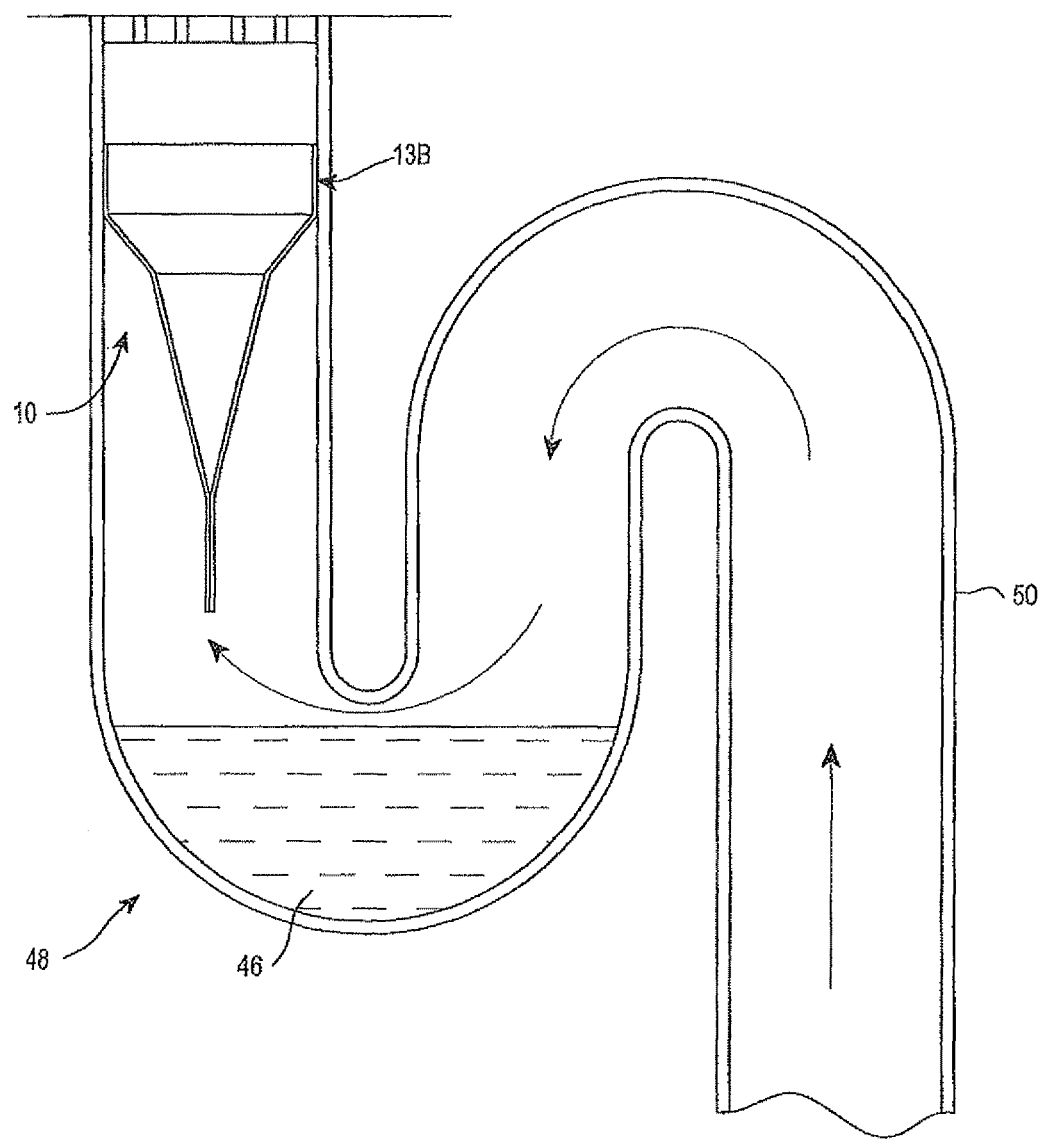
FIG. 5 is a side view of the plumbing fitting of the invention when adapted for insertion into a smaller diameter pipe above an "S" bend assembly.

Again with reference to FIG. 1, in a preferred arrangement the cup element 12 is formed in a number of steps or tiers 13, with the outer diameter of each tier adapted to fit in a particular standard pipe diameter. For example in the two-tier example of the invention shown in FIGS. 1 to 4, the upper tier 13A could be removed for fitting into a smaller diameter pipe as shown in FIG. 5.

Figure 6:
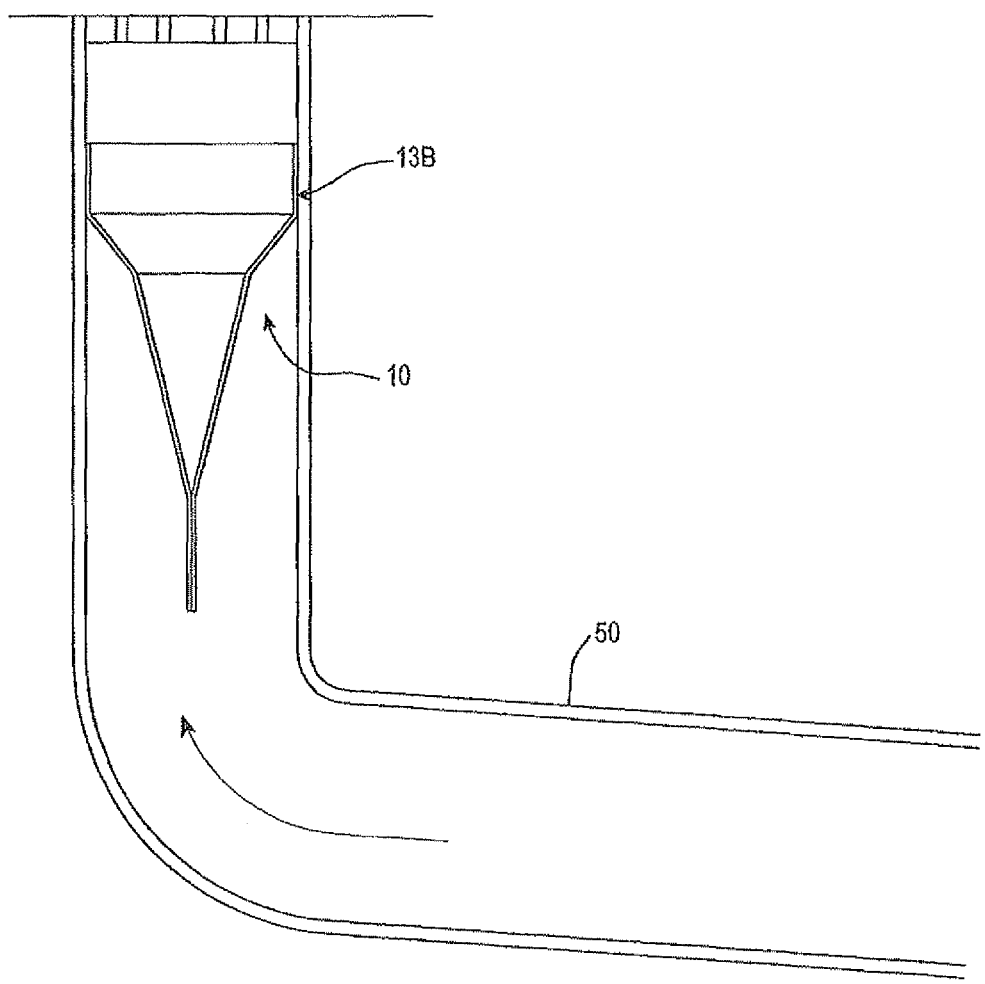
FIG. 6 is a side view of the plumbing fitting, when adapted for insertion into a smaller diameter waste pipe in which an "S" bend assembly has not been provided.
Figure 7:
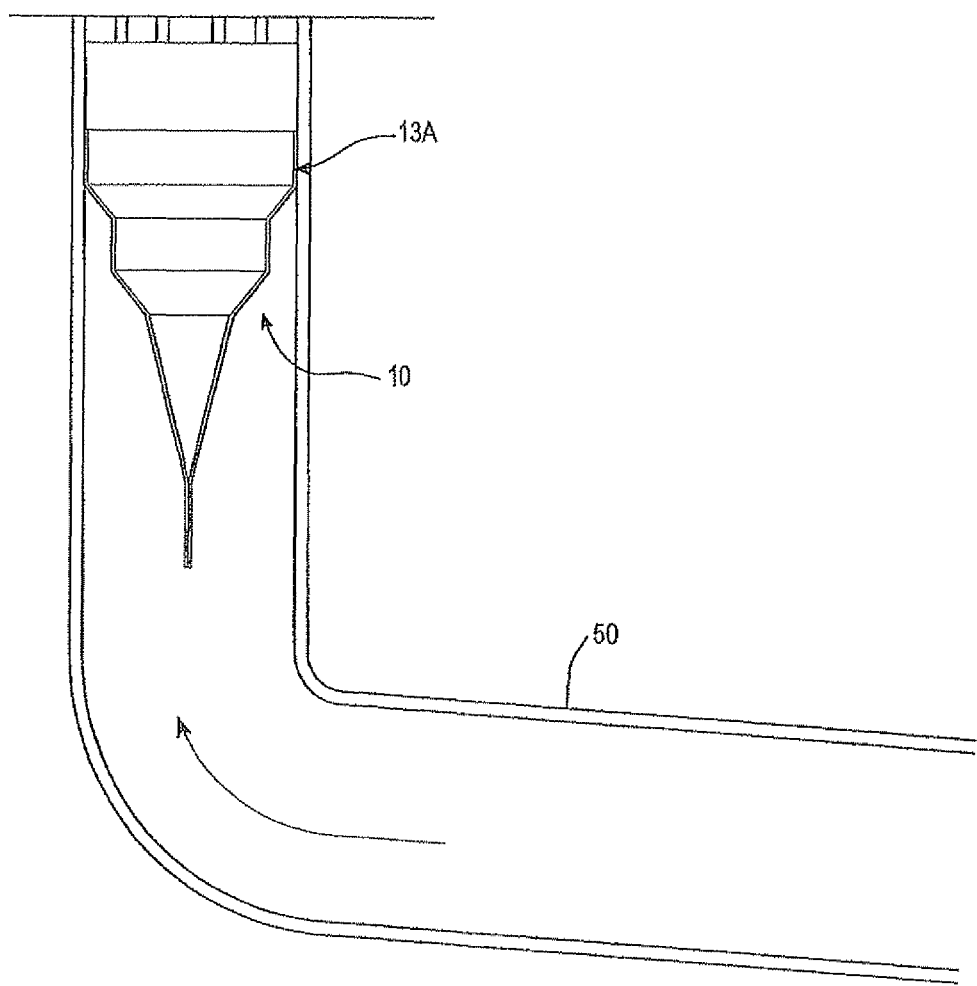
FIG. 7 is a side view of the plumbing fitting as shown in FIG. 1 inserted into a larger diameter waste pipe in which an "S" bend assembly has not been provided.

As shown in FIGS. 6 and 7, the fitting 10 of the present invention also is able to provide an effective block against odours and other undesirable effects, from issuing from the end of a waste pipe 50 in those cases where there is no "S" bend provided.

In Use

The plumbing fitting 10 of the present invention may be fitted as original equipment below the waste outlets or other desired pipe locations in new buildings.

It is also readily retro-fitted to existing waste outlets and shower waste fittings 40, simply by removing the grating 50 from the waste fitting 40 and pushing the fitting 10 to nest in the pipe below the waste fitting 40. The grating is then replaced and the floor or shower waste functions as normal, but now with no risk of unpleasant odours rising from the waste outlet.

Although the above description and drawings have been largely directed at a floor waste, it will be understood that the fitting of the invention may be applied to any situation in which unwanted odours or other undesirable effects may intrude into a building or other enclosed area. Thus the invention may equally be applied to urinals, shower wastes, plant room wastes, commercial kitchens, laundry floor wastes, as well as to hand basins, laundry tubs and other water receiving bodies.

Composition Variations

In specific embodiments specialised forms of plastic or rubber can be utilised in order to impart advantageous collateral properties. In one embodiment an antibacterial polymer can be utilised which has particular use in hospitals or like institutions where risk of infection contraction can be higher than elsewhere.

Alternative forms of rubber which can be used include the following:
- Nitrile rubber
- Natural rubber
- SBR rubber
- Neoprene rubber
- EPDM rubber
- Butyl rubber
- Silicone rubber
- Viton rubber These different rubbers are compared in table one below.

| | NATURAL | SBR | NEOPRENE | EPDM | NITRILE | BUTYL | SILICONE | VITON |
|---|---|---|---|---|---|---|---|---|
| | GENERAL CHARACTERISTICS | | | | | | | |
| SERVICE TEMPERATURE | −55 TO +90 | −45 TO +90 | −55 TO +95 | −50 TO +145 | −55 TO +110 | −45 TO +120 | −75 TO +235 | −20 TO 200 |
| HARDNESS RANGE | 20 TO 90 | 40 TO 90 | 40 TO 95 | 30 TO 90 | 40 TO 95 | 40 TO 75 | 10 TO 85 | 50-95 |

-continued

| | NATURAL | SBR | NEOPRENE | EPDM | NITRILE | BUTYL | SILICONE | VITON |
|---|---|---|---|---|---|---|---|---|
| TENSILE STRENGTH | 22 Mpa | 17 Mpa | 20 Mpa | 15 Mpa | 15 Mpa | 14 Mpa | 10 Mpa | 14 Mpa |
| COMPRESSION SET | GOOD | GOOD | FAIR TO GOOD | GOOD | GOOD | FAIR | FAIR | V GOOD |
| ATMOSPHERIC RESISTANCE | | | | | | | | |
| OZONE RESISTANCE | POOR | POOR | V GOOD | EXCELENT | FAIR | EXCELENT | EXCELENT | EXCELENT |
| HEAT AGING | FAIR | FAIR TO GOOD | V GOOD | EXCELENT | GOOD | V GOOD | OUT STANDING | EXCLENT |
| FLAME RESISTANCE | POOR | POOR | GOOD | FAIR | POOR | POOR | FAIR | GOOD |
| SUNLIGHT AGING | POOR | FAIR | V GOOD | EXCELENT | POOR | V GOOD | EXCELENT | V GOOD |
| OXIDATION RESISTANCE | GOOD | FAIR | V GOOD | EXCELENT | GOOD | EXCELENT | EXCELENT | V GOOD |
| OIL RESISTANCE | | | | | | | | |
| ALIPHATIC OILS | POOR | POOR | GOOD | POOR | EXCELENT | POOR | POOR | EXCELENT |
| ARMOATIC OILS | POOR | POOR | FAIR | POOR | GOOD | POOR | POOR | EXCELENT |
| KETONES | FAIR TO GOOD | GOOD | POOR TO FAIR | EXCELENT | POOR | GOOD | FAIR | POOR |
| LUBRICATING OILS | POOR | POOR | GOOD | POOR | V GOOD | POOR | FAIR | EXCELENT |
| ANIMAL AND VEGETABLE OILS | POOR TO GOOD | POOR TO GOOD | GOOD | V GOOD | V GOOD | V GOOD | V GOOD | EXCELENT |
| ACID RESISTANCE | | | | | | | | |
| DILUTE | FAIR TO GOOD | FAIR TO GOOD | EXCELENT | EXCELENT | GOOD | EXCELENT | EXCELENT | EXCELENT |
| CONCENTRATED | FAIR TO GOOD | FAIR TO GOOD | GOOD | GOOD | GOOD | EXCELENT | FAIR | EXCELENT |
| OTHER PROPERTIES | | | | | | | | |
| ELECTRICAL INSULATION | GOOD TO EXCELENT | GOOD TO EXCELENT | POOR | OUT STANDING | POOR | GOOD TO EXCELENT | EXCELENT | POOR |
| ABRASION RESISTANCE | EXCELENT | GOOD TO EXCELENT | EXCELENT | GOOD TO EXCELENT | GOOD | GOOD | POOR | GOOD |

Further Embodiments

Figure 8:
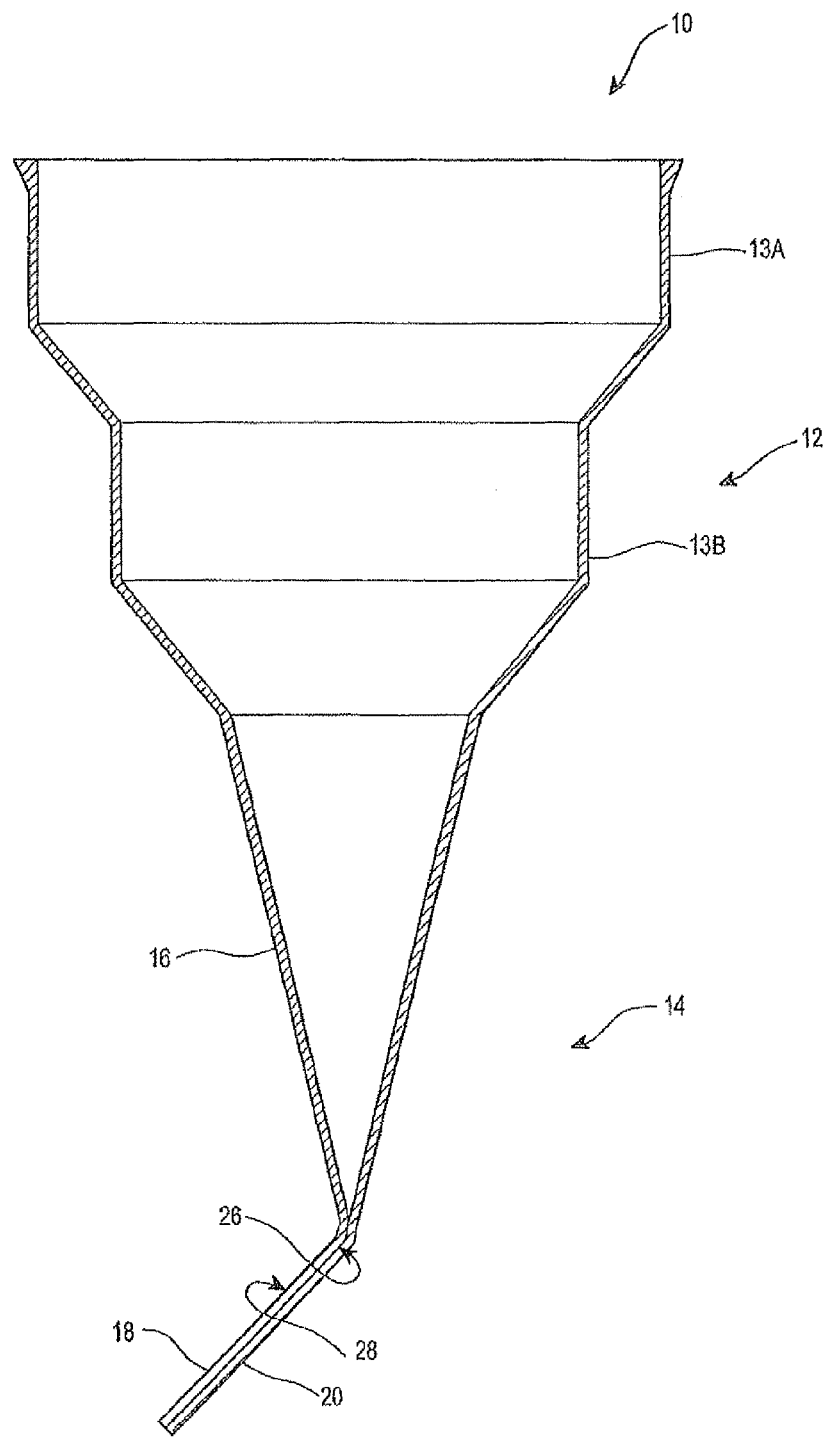
FIG. 8 is a side view of the plumbing fitting according to a further preferred embodiment.

With reference to FIG. 8 there is illustrated a variation on the entry lip.

With reference to FIG. 9 there is illustrated a single tier version of the device.

With reference to FIG. 10 there is illustrated a scaled down version of the device which is particularly useful for use in situations where there is an offtake. (see inset).

With reference to FIG. 8 there is illustrated in side section a plumbing fitting 30 in accordance with a further preferred embodiment having a region of constriction 31 which is inclined or inflected relative to the longitudinal axis of the plumbing fitting 30. In a preferred form the inflection is approximately at 45 degrees to the longitudinal axis. In this embodiment like components are numbered as for the earlier embodiments.

The above describes only some embodiments of the present invention and modifications, obvious to those skilled in the art, can be made thereto without departing from the scope of the present invention. Thus while the described embodiment is directed to a particular one-way valve structure comprising in-contact flexible elastomer flaps, other one way valve arrangements may be encompassed by the invention.

The invention claimed is:

1. A blocking plumbing fitting; said fitting comprising a flexible cup element and a one way valve element depending from said flexible cup element; said cup element and said one way valve element integrally moulded of an elastomer material; said one way valve element comprising opposing elongate flexible flaps of said elastomer material; said cup element formed in at least two tiers; an uppermost one of said at least two tiers provided with an outwardly projecting lip at an upper edge of said uppermost tier; an outer diameter of said cup element conforming to inner diameters of standard waste pipe elements such that said fitting may be inserted into said waste pipe element below a waste outlet or at another desired pipe location to form an airtight seal between an outer surface and said lip of said cup element and an internal surface of said waste pipe element, and wherein said one way valve element permits liquid to pass through said waste pipe element; said one way valve element preventing passage of odours, soapsuds, vermin, noise and other undesirable elements issuing from said pipe element.

2. The fitting of claim 1 Wherein said fitting is located downstream of a waste outlet.

3. The fitting of claim 2 wherein said waste outlet includes: floor wastes of showers, laundry, plant room, commercial kitchens and other water receiving bodies.

4. The fitting of claim 1 wherein one or more tiers may be removed from said cup element so as to adapt said fitting to a desired standard pipe size.

5. The fitting of claim 1 wherein outer surfaces of said flexible cup element form an air tight seal with portions of inner surfaces of said pipe element when said fitting is inserted into said pipe element.

6. The fitting of claim 1 wherein said one way valve comprises a flexible sheath formed of said two opposing elongate flexible flaps joined at their respective side edges.

7. The fitting of claim 6 wherein inward facing surfaces of said two opposing elongate flexible flaps are in contact one to another when waste water is absent from said waste outlet; contact between said surfaces preventing odour, soapsuds, vermin, noise and other undesirable elements from issuing from said pipe element.

8. The fitting of claim 6 wherein flexibility of said elongate flexible flaps is such that said flaps are forced apart by water flowing into said cup element; said water passing between said flaps and issuing from a lower end of said one way valve.

9. The fitting of claim 6 wherein a lower end of said cup element is provided with an aperture; said aperture communicating with a funnel structure merging with upper portions of said opposing elongate flaps.

10. The fitting of claim 9 wherein said flexible cup element is stepped down in diameter in stages from a first diameter at an upper rim of said cup element to a second diameter at said aperture.

11. The fitting of claim 6 wherein volume of said flexible cup element is arranged such that weight of water in said cup element is sufficient to force a passage for water between said opposing elongate flexible flaps.

* * * * *

UNITED STATES PATENT AND TRADEMARK OFFICE
CERTIFICATE OF CORRECTION

PATENT NO.         : 8,622,090 B2
APPLICATION NO.    : 13/129580
DATED              : January 7, 2014
INVENTOR(S)        : Anthony William Larkin and Ronnie Shoushani It is certified that error appears in the above-identified patent and that said Letters Patent is hereby corrected as shown below:

On the Title Page, Assignee Item (73) should be corrected as follows:
Change:
-- Larkin & Shoshani Solutions Pty Ltd., --
to
"Larkin & Shoushani Solutions Pty Ltd.,"

Signed and Sealed this
Eleventh Day of March, 2014

Michelle K. Lee
*Deputy Director of the United States Patent and Trademark Office*